United States Patent [19]

Linder et al.

[11] Patent Number: 4,832,312

[45] Date of Patent: May 23, 1989

[54] MAGNETIC VALVE

[75] Inventors: Ernst Linder, Muehlacker; Helmut Rembold, Stuttgart; Manfred Ruoff, Moeglingen; Walter Schlagmueller, Schwieberdingen, all of Fed. Rep. of Germany

[73] Assignee: Robert Bosch GmbH, Stuttgart, Fed. Rep. of Germany

[21] Appl. No.: 236,965

[22] Filed: Aug. 26, 1988

[30] Foreign Application Priority Data

Sep. 26, 1987 [DE] Fed. Rep. of Germany ....... 3732553

[51] Int. Cl.[4] ...................... F02M 39/00; F16K 31/06

[52] U.S. Cl. ............................... 251/129.07; 123/458; 251/129.15; 251/282

[58] Field of Search ............................... 123/458, 506; 251/129.02, 129.07, 282, 129.15

[56] References Cited

U.S. PATENT DOCUMENTS

| | | | |
|---|---|---|---|
| 3,568,791 | 2/1968 | Wells | 251/129.07 |
| 4,276,000 | 6/1981 | Warwicker . | |
| 4,449,503 | 5/1984 | Luscomb | 123/458 |
| 4,505,243 | 3/1985 | Miwa | 123/458 |
| 4,523,569 | 6/1985 | Seilly | 123/458 |
| 4,583,509 | 4/1986 | Schechter | 123/458 |
| 4,619,239 | 10/1986 | Wallenfang et al. . | |
| 4,647,008 | 3/1987 | Shirai | 251/129.07 |
| 4,653,723 | 3/1987 | Risk | 123/458 |
| 4,690,373 | 9/1987 | Linder | 251/129.02 |

FOREIGN PATENT DOCUMENTS

| | | | |
|---|---|---|---|
| 2642217 | 3/1977 | Fed. Rep. of Germany | 251/129.07 |

*Primary Examiner*—Carl Stuart Miller

*Attorney, Agent, or Firm*—Edwin E. Greigg

[57] ABSTRACT

For controlling high-pressure phases during the stroke of a pump piston of a fuel injection pump, magnetic valves are also used, which are built into relief lines of the pump work chamber of such fuel injection pumps and which with the instant of closure of the relief line determine the injection onset and with the instant of reopening of the relief line determine the end of injection and hence the injection quantity. Such valves must be capable of switching rapidly, in view of the high rpm of internal combustion engines, yet must be as small as possible and use the least possible energy. By using a piston slide which in the closing state is balanced in pressure on the high-pressure side, and by relieving the chambers defined on the face end by the piston slide, a fast-switching, recoilless magnetic valve is obtained, which is opened by a restoring spring when the electromagnet is in the currentless state. This makes the use of the magentic valve in combination with electrically controlled injection pumps particularly advantageous.

21 Claims, 2 Drawing Sheets

MAGNETIC VALVE

BACKGROUND OF THE INVENTION

The invention is based on a magnetic valve as defined hereinafter. In a known magnetic valve of this type, the two ends of the piston slide have faces of different sizes, and each of these face ends encloses one pressure chamber. The two pressure chambers communicate with one another via an axial bore in the piston slide, and they each communicate simultaneously, via a respective throttling clearance of the adjoining piston guide, with the high-pressure side and the relief side. Because of the unequal volumetric change in these pressure chambers that takes place upon the stroke of the piston slide, a piston slide movement can occur only when pressure fluid is at the same time flowing in or out via the aforementioned clearance. When the piston slide is at a standstill, or in other words is in its closing position, the two pressure chambers fill to the high-pressure level. This embodiment is intended to assure damped adjustment of the piston slide, to attain not only stable, controlled movements of the piston slide, but also a more-accurate control outcome. However, this embodiment has the disadvantage that the control speed of the piston slide is reduced considerably, unless there is a large amount of clearance on both the high-pressure and low-pressure sides in the piston guide. Increasing the clearance naturally causes leaking of the valve, and hence inaccurate control, or a lowering of the high-pressure level that is to be adhered to. On the other hand, if the clearance is small, considerable energy must be expended to switch the valve. That in turn requires large control mechanisms, which present problems in terms of space, at the very least. In the prior art, a very large-sized double magnet is required for switching the piston slide.

OBJECT AND SUMMARY OF THE INVENTION

The magnetic valve according to the invention has an advantage over the prior art that the closing element of the magnetic valve, that is, the piston slide, is balanced in pressure not only in the closing state but during its opening movement. Moreover, pressure differences at the piston slide resulting from differences in the transit time of pressure waves that are triggered in the control fluid when the piston slide opens and closes, are avoided because of the relief provided, and are reduced in a metered manner at the throttle.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
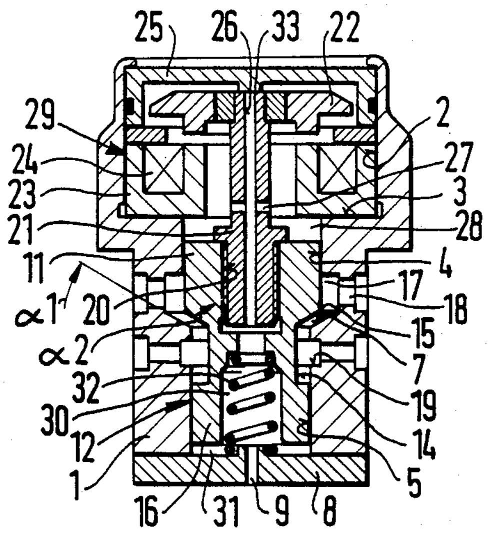
FIG. 1 shows a first exemplary embodiment of the invention having a coaxial relief throttle in the wall of the chamber enclosed by the second cylindrical portion.

FIG. 1 shows the first exemplary embodiment of the magnetic valve according to the invention, which has a valve housing 1 including a two-step axial stepped bore. The stepped bore has a first stepped bore portion 2, which with a shoulder 3 located in a radial plane merges with the second, middle stepped bore portion 4, which in turn merges with the third stepped bore portion 5. The transition between stepped portions 4 and 5 has a sloping shoulder, serving as a valve seat 7, which tapers to the third stepped bore portion at a first pointed cone angle $\alpha 1$. The third stepped bore portion is closed at its face end with a closure plate 8 which has a coaxial passage embodied as a throttle 9. Relative to the closure plate 8 as well as all closure plates affixed to the various embodiments revealed in this application it is to be understood that those skilled in the art can use any method of affixation they desire.

The second stepped bore portion 4 serves as a guide bore for a guide portion 11 of a piston slide 12, which has a transitional portion, adjoining the guide portion, in the form of an annular recess 14, which with the guide portion forms a sharp sealing edge 15 corresponding in diameter with the guide portion diameter with which the piston slide comes to rest, in the closing position on the valve seat 7. The annular recess 14 extends into the third stepped bore portion 5, which forms an outlet bore, and there merges with a second cylindrical portion 16 of the piston slide, which slides in the outlet bore. To form the sealing edge 15, the piston slide has a conical axial limitation of the recess 14, with a second pointed cone angle $\alpha 2$, which is larger than the first pointed cone angle $\alpha 1$. Thus the sealing line 15 always defines the narrowest opening cross section of the magnetic valve. An annular chamber 17, in which the shoulder embodying the valve seat 7 continues and into which the guide bore 4 discharges, is formed directly adjacent the valve seat 7, toward the guide bore. Discharging radially into the annular chamber 17 is a connecting line 18, which leads from a high-pressure chamber, not otherwise shown here, that is at least intermittently brought to a high fluid pressure. One such high-pressure chamber is the pump work chamber of a fuel injection pump, in which the highpressure phase of pumping to the injection valves is controlled by not relieving the pump work chamber during the pumping stroke of the pump piston of the fuel injection pump. This can be done with the magnetic valve according to the invention. An annular groove 19 is also provided in the wall of the outlet bore 5, communicating continuously with the annular recess 14; from this groove 19, the connecting line 18 continues to a relief chamber, which for example may be the pump suction chamber, which is at a low pressure level, that is often provided in an injection pump. However, for relief purposes, the connecting line may also lead to a fluid supply container, or in the above example to a fuel supply container, or to the intake side of a preceding feed pump with which such fuel injection pumps may be provided. On its guide portion 11, the piston slide 12 also has an axial threaded bore 20, into which an actuation rod 21 is threaded. A flat armature 22 is secured to the end of the actuation rod. The magnet core 23 and winding 24 of the electromagnet 29 is inserted into the first stepped bore portion, adjoining the shoulder 3, and acts upon the armature 22. Finally, the first stepped bore portion is finally tightly closed with a cap 25 which includes a portion extending toward the core 23 and which secures the core in place.

The actuation rod 21 is provided with an axial bore 26, through which a transverse bore 27 extends, which discharges in the vicinity of the magnet core and connects the first stepped bore portion 2 and the chamber 28, defined on the end of the adjacent piston slide 12, with a through conduit 30 in the piston slide 12. The through conduit discharges into the chamber 31 enclosed on the face end by the second cylindrical portion 16 in the outlet bore 5, and together with the axial bore 26 or the transverse bore 27 serves as a connecting conduit between the chambers 31 and 28. Finally, a restoring spring 32, embodied as a compression spring, is fastened between the plate 8 and a narrowing portion of the through conduit 30; when the electromagnet is not excited, this spring urges the piston slide into the opening position of the magnetic valve. The opening position of the piston slide is defined by a stop 33 embodied on the cap 25, on which stop the actuation rod 21 or armature 22 comes to rest.

In the magnetic valve embodied in this way, the piston slide is balanced in pressure in its closing position, because the high pressure in the annular chamber 17, supplied via the connecting line 18, does not encounter any axial engagement surface Since the two face ends of the piston slide communicate with one another through the connecting conduit 26, 27, 30, a pressure equilibrium prevails there as well. The excited electromagnet 29 accordingly needs to overcome only the force of the restoring spring 32. If the restoring spring 32 moves the piston slide in the opening direction, then the quantities of fuel that are positively displaced by the piston slide are capable of overflowing via the connecting conduit 26, 30. Since the chambers 31 and 28 are pressure-relieved, no impeding pressures are built up in them; pressure waves, on the other hand, are equalized at the throttle 9 provided, so that the piston slide can move continuously into the opening position without any uncontrolled adjusting movements. Because of the pressure relief of the face ends, the movement is also very fast, so that precise instants for relieving the adjoining high-pressure chamber are attained. As a result of the pressure relief, only slight adjusting forces are needed at the piston slide in order to move it into the closing position. Another advantage is that with the aid of the through conduit 30 of the axial bore 26, the mass of the magnetic valve that is to be moved can be kept small. The mass is also reduced by the use of the actuation rod, and the magnet core can extend substantially radially inward, overlapping the piston slide 12, with the overall result being an elongated, compact shape for the magnetic valve.

Figure 2:
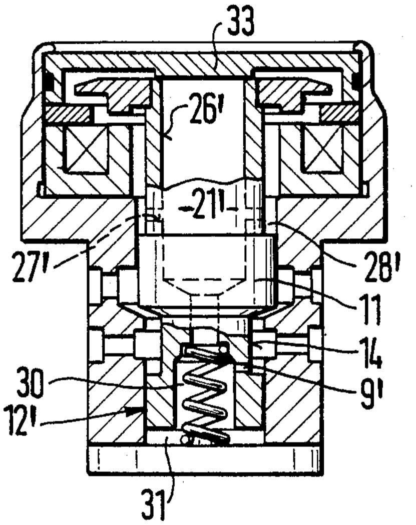
FIG. 2 shows a second exemplary embodiment of the magnetic valve, having a piston slide provided with a longitudinal through bore, from which a relief throttle leads to an annular recess.

FIG. 2 shows a modified magnetic valve, having substantially identical elements as above, so that the description of FIG. 1 is largely applicable to it as well. Unlike FIG. 1, however, in this case the chamber 31 is no longer relieved via the throttle located coaxially with the axis of the piston slide, but rather via a throttle

9', which is located in the wall of the piston slid 12' and connects the through conduit 30 with the annular recess 14. Another difference from the exemplary embodiment of FIG. 1 is that the actuation rod 21' is embodied as a tube having a diameter only slightly less than that of the guide portion 11. This actuation rod, like that of FIG. 1, is made from nonmagnetic material, to prevent it from sticking to the stop 33. Once again, the actuation rod 21' has a transverse bore 27, which connects the chamber 20 with the through conduit 30 or with the broad axial bore 26'. The mode of operation of this valve is otherwise identical to that of FIG. 1.

Figure 3:
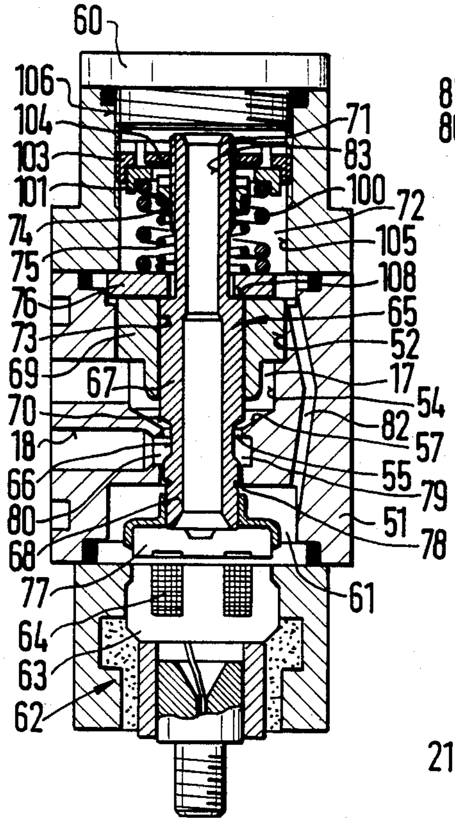
FIG. 3 shows a third exemplary embodiment of the magnetic valve according to the invention, having a piston slide, the second cylindrical portion of which, along with the outlet bore, forms a throttle gap.

A more extensively modified form of the magnetic valve is shown in FIG. 3. There, a two-step stepped bore is once again provided in a valve housing 51, of which the middle or second stepped bore portion 54 is embodied analogously to the second stepped bore portion 4 of FIG. 1. Here, however, this second stepped bore portion is not at the same time the guide portion of the piston slide. The second stepped bore 54 again merges, via a shoulder embodied as a valve seat 57 in the form of a conical jacket, with a third stepped bore portion, which analogously to FIG. 1 embodies the outlet bore 55. The outlet bore, finally, again discharges into an adjoining chamber 61 on the face end, but unlike the exemplary embodiment of FIG. 1, the chamber 61 is closed off by the housing of an electromagnet 62 having a magnet core 63 and winding 64.

In this exemplary embodiment, the diameter of the piston slide 65 is substantially the same, interrupted by an annular recess 66 and thereby dividing the piston slide into an upper guide portion 67 and a lower second cylindrical portion 68. The guide portion 67 is supported in a bushing 69, which is inserted into the first stepped bore portion 52 and with a reduced diameter protrudes far into the second stepped bore portion 54. The edge between the guide portion 67 and a conically extending axial limitation of the recess 66 again cooperates, as a sealing edge 70, with the valve seat. The piston slide has a portion 71 of reduced diameter, which protrudes from the guide bore 73, furnished by the inner bore of the bushing 69, and at its end has a spring plate 74. Supported on the spring plate is a restoring spring 75, which on its other end rests on the valve housing, in particular on a stop plate 76 placed on top of the bushing 69; the stop plate 76, in turn, is retained by a cover cap 60 that closes off the valve housing and encloses a chamber 72, similar to the chamber 28 of FIG. 1.

On the other end of the piston slide 67, it is adapted to protrude into the chamber 61, where it is connected to an armature 77, which upon excitation of the winding 64 moves the piston slide, with the sealing edge 70, onto the valve seat 57 counter to the force of the restoring spring 75. Finally, the chamber 61 communicates via a slight diameter reduction of the piston slide, forming an annular gap 78, with the radial recess 79, which is again provided here in the outlet bore 55. An outlet opening 80 of the connecting line 18 leads from this recess 79 to the relief chamber. On the other end, arriving from the high-pressure chamber, this connecting line discharges into the second stepped bore portion 54, which together with the bushing 69 forms the annular chamber 17 as in the exemplary embodiment of FIG. 1. Finally, the chamber 61 and 72 also communicate with one another by way of a connecting conduit 82, and the piston slide also has a through conduit 83, which here serves more as a means of reducing the mass to be moved than as a means of carrying fuel and may, for example, be closed at one end.

This embodiment has the advantage that the piston slide is very slender, and that it can be made of bar material, requiring few machining operations.

Figure 4:
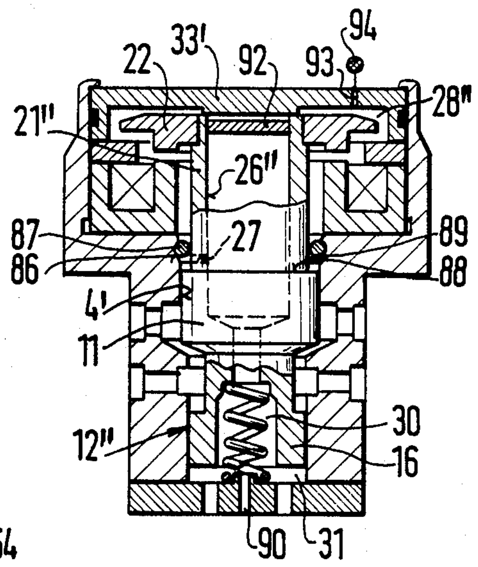
FIG. 4 shows a fourth exemplary embodiment of the magnetic valve according to the invention, in which only a portion of the guide portion is exposed to the fluid pressure, while the remainder of the end face communicates via a throttle with the ambient air.

In the foregoing embodiments the chambers 31, 28 or 61, 72 adjoining the ends of the piston slide were filled with fuel, and in particular the chamber in which the armature 22 of the electromagnet 29 moved; now, in FIG. 4, which substantially is a further development of the embodiment of FIG. 2, only one of the chambers is subjected to fuel. To this end, a flat recess 86 is provided in the end piece of the guide bore 4', and an O-ring 87 is positioned in this recess 86. With its inner contour, the O-ring comes to rest on the actuation rod 21'', which is embodied similarly to that of FIG. 2. The chamber 89 enclosed between the O-ring 87 and the remaining annular end face 88 between the actuation rod 21'' and the outer circumference of the guide portion 11 is relieved via the transverse bore 27, which here branches off from the axial bore 26'' that merges with the through conduit 30 of the piston slide 12''. The chamber 31 enclosed by the second cylindrical portion 16 and into which the through bore 30 discharges is relieved via an opening 90.

The end of the actuation rod 21'' toward the armature is tightly closed by a likewise nonmagnetic disk 92. The chamber 28'' adjoining the O-ring 87 toward the armature is relieved to the ambient air via a throttle 93 in the cap 33, which may be preceded by a filter 94.

This embodiment has the advantage that the armature 22 having a large surface area is no longer moved, hydraulically damped, in the fluid medium but rather in the air, so that substantially lesser restoring moments act upon the piston slide, and its adjusting speed can be increased. The O-ring 87 provided for sealing is readily movable in the flat recess 86. Because it is supported freely in this way, it can execute a flexing or rocking movement upon the axial stroke of the piston slide, resulting in only slight counteractive forces which accordingly do not impair the movement of the piston slide. This kind of installation is possible because virtually no high pressures arise at the installation site.

Figure 5:
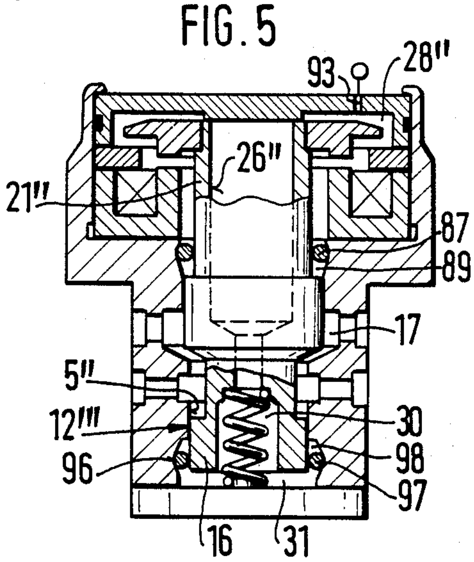
FIG. 5 shows a fifth exemplary embodiment, in which the piston slide is sealed off by sealing rings, and the two chambers at the end faces of the piston slide communicate with the ambient air via a throttle.

In a fifth exemplary embodiment, a further development of FIG. 4 is shown. Once again, the O-ring 87 is provided on the guide bore 4', and the chamber toward the armature is relieved thereby via the throttle 93. This provision of making a chamber 28'' on the end face air-filled and of relieving it to the atmosphere is extended, in the exemplary embodiment of FIG. 5, to the other end of the piston slide 12''' as well. Here, an annular flat recess 96 is also provided at the end of the outlet bore 5'', and a second O-ring 97 is fitted into the recess, here resting sealingly with its inside on the end of the second cylindrical portion 16. The disk 92 that is also provided in the exemplary embodiment of FIG. 4 and closes the axial bore 26'' is omitted this time, so that there is free communication between the chamber 28'' and the chamber 31 defined by the second cylindrical portion 16, both chambers being vented by means of the through conduit 30 in the piston slide or the axial bore 26'' in the actuation rod 21'' via the throttle 93. The chambers 89 enclosed by the O-rings on the pressure side are once again relieved. With little resistance, the second O-ring 97 is again capable of compensating for the movement of the piston slide, with its relatively short stroke, by flexing. It is also conceivable to replace the O-rings with diaphragms, which further lessens the deflecting forces. This exemplary embodiment, like those of FIGS. 2 and 4, has a piston slide of little mass, and additionally has the advantage that positive displacement of fluid by the end faces has virtually no effect on the opening and closing of the magnetic valve. The piston slide has a very small mass to be moved and can be moved into its terminal positions very quickly with the low positive displacement forces available.

In a further development of FIG. 3, the portion 71 of the piston slide has a plate-like stop 104, which like the spring plate 74 can be threaded onto the portion 71 and is adjustably fixed thereto. The stop 104 is disposed between the spring plate and the end of the portion 71 and radially protrudes past the spring plate 74. The covering cap 60 also has a cylindrical inner circumferential wall 105, which is provided with a thread 106 into which an adjustable annular stop 103 is fastened. A second spring plate 101, between which and the stop plate 76 a second compression spring 100 is fastened, comes to rest on this stop 103 toward the guide bore.

In FIG. 3 as shown, the piston slide is in the open position, when the magnet is not excited. It is retained in this position by the restoring spring 75; a shoulder 108 between the guide portion 67 and the portion 71 comes to rest on the stop plate 76. Upon partial excitation of the electromagnet, the piston slide is displaced axially in the closing direction, counter to the force of the restoring spring 75, far enough that with the adjustable stop 104 it comes into contact with the spring plate 101. This position brings about a partial closing position of the magnetic valve, in which fluid can drain out in a throttled manner via the connecting line 18, for partial relief. Beyond a second excitation stage of the magnet, the biasing force of the second 100 is then overcome, and the piston slide is moved into the closing position.

This embodiment has the advantage that a large relief cross section of the connecting line is available during the intake and diversion phase, of a pump work chamber, for instance. Rapid relief is thereby attained, and when the invention is used in fuel injection pumps, rapid relief of the pump work chamber also effects an accurate end of the high-pressure pumping phase. If the connecting line additionally acts as a fill line for the pump work chamber, then with the large communicating cross section when the magnetic valve is fully opened, a large overflow cross section is avail- . able, which assures good filling of the pump work chamber. At the onset of the pumping stroke of the pump piston of an associated fuel injection pump, the connecting line can initially be partly closed, for the injection onset, and then, in order to determine the actual onset of the high-pressure pumping phase of the pump piston, it can be closed completely. For this latter closing operation, only a short piston slide stroke remains to be executed. The air gap between the armature and the core of the electromagnet is also correspondingly small, which assures short switching times while requiring only little current for the electromagnet. With a magnetic valve embodied in this way, the total opening cross section in the connecting line 18 can be made very large, since the total stroke of the piston slide is not needed for determining the onset of the high-pressure pumping phase. Because of the large overflow cross sections, the connecting line can advantageously also, in principle, be used as a fill line. This has the advantage that if there is a failure, which primarily takes the form of jamming of the piston slide, the pump work chamber is either not supplied with fuel at all, or the required high pressure for an injection event cannot be built up. The use of such a magnetic valve thus improves safety, and especially prevents engine racing and damage in the operation of an internal combustion engine.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A magnetic valve for controlling the passageway of a connecting line (18) between a high-pressure chamber, in particular a pump work chamber of a fuel injection pump, that is at least intermittently at high fluid pressure an low fluid pressure comprising a valve housing (1) and a stepped guide bore disposed in said housing, a valve closing element in said stepped bore, a piston slide displaceable in said stepped bore by an electromagnet counter to the force of a restoring spring, an annular chamber which merges conically and narrowing with a first pointed cone angle ($\alpha 1$) with an outlet bore coaxial with a guide bore (5), a transitional portion, embodied by an annular recess, of the cylindrical piston slide, which up to said cone angle ($\alpha 1$) is provided as a guide portion (11) with continuously the same diameter, which is guided in a radially spaced apart manner by the guide bore (5), wherein the transition between the cylindrical guide portion (11) and the transitional portion narrows conically toward the transitional portion, with a second pointed cone angle ($\alpha 2$) that is larger than the first pointed cone angle ($\alpha 1$), and the boundary line between the guide portion and the transitional portion serves as a sealing edge with which the piston slide, in its closing position, comes to rest on a valve seat formed by the portion of the annular chamber narrowing conically toward the guide bore (5), and having a second cylindrical portion, sliding in the guide bore (5), of the piston slide, which second cylindrical portion adjoins the annular recess and a lower face end of said piston slide defines a chamber in the valve housing (1), which chamber communicates via a connecting conduit with a chamber defined by an upper face end of the guide portion and which chamber communicates via a throttle with a relief chamber, further having an inlet opening of a connecting line (18), connected with the high-pressure chamber located in the wall of the annular chamber and having an outlet opening located in the wall of the guide bore inside the region of overlap with the annular recess and having an axial stop against which said piston slide is forced into an opening position when the sealing edge is lifted from the valve seat and said chambers in the valve housing (1) defined by upper and lower face ends of the piston slide are pressure-relieved, and said piston slide is urged toward the opening position by the restoring spring.

2. A magnetic valve as defined by claim 1, in which said piston slide has a through conduit (30, 26), which connects the upper and lower face ends of the piston slide with one another, and said throttle (9) is disposed as a throttle bore in an end enclosure of said bore (5).

3. A magnetic valve as defined by claim 1, in which said chambers (61, 72) communicate with an annular recess (66) via an annular gap (78), embodying said throttle, between a second cylindrical portion (68) and a guide bore (55).

4. A magnetic valve as defined by claim 1, in which said piston slide has a through conduit (30, 26'), which connects the upper and lower face ends of the piston slide with one another, and the throttle (9') is disposed in a connecting bore between the through conduit (30) and the annular recess (14).

5. A magnetic valve as defined by claim 2, in which said restoring spring (32) is fastened inside an axial recess (30) of said piston slide, between said axial recess and said end enclosure (8) of said guide bore (5).

6. A magnetic valve as defined by claim 1, in which said restoring spring((75) is supported on a spring plate (74), which is supported on an end of a portion (71) of the guide bore portion (67) of the piston slide that protrudes out of a guide bore (73), and that the armature (77) of the electromagnet engages the opposed portion of the piston slide.

7. A magnetic valve as defined by claim 2, in which said restoring spring (75) is supported on a spring plate (74), which is supported on an end of a portion (71) of the guide bore portion (67) of the piston slide that protrudes out of a guide bore (73), and that the armature (77) of the electromagnet engages the opposed portion of the piston slide.

8. A magnetic valve as defined by claim 3, in which said restoring spring (75) is supported on a spring plate (74), which is supported on an end of a portion (71) of the guide bore portion (67) of the piston slide that protrudes out of a guide bore (73), and that the armature (77) of the electromagnet engages the opposed portion of the piston slide.

9. A magnetic valve as defined by claim 4, in which said restoring spring (75) is supported on a spring plate (74), which is supported on one end of a portion (71) of the guide bore portion (67) of the piston slide that protrudes out of a guide bore (73), and that the armature (77) of the electromagnet engages the opposed portion of the piston slide.

10. A magnetic valve as defined by claim 1, in which an end of said guide bore (4') remote from the annular chamber (17) has an annular, flat recess (86), in which an O-ring (87) is movable axially back and forth with slight deformation, which ring on the other side rests with its inside diameter on cylindrical portion (21'') of said piston slide protruding from the guide bore, which portion (21'') is reduced in diameter as compared with the guide portion (11) of the piston slide, and which portion (21''), between where said portion (21'') is contacted by said O-ring (87) and the guide portion (11), has a connecting conduit (27), which leads to the chamber (31) defined by the lower face end of the piston slide toward the guide bore.

11. A magnetic valve as defined by claim 2, in which an end of said guide bore (4') remote from the annular chamber (17) has an annular, flat recess(86), in which an O-ring (87) is movable axially back and forth with slight deformation, which ring on the other side rests with it inside diameter on a cylindrical portion (21'') of said piston slide protruding from the guide bore, which portion (21'') is reduced in diameter as compared with the guide portion (11) of the piston slide, and which portion (21''), between where said portion (21'') is contacted by said O-ring (87) and the guide portion (11), has a connecting conduit (27), which leads to the chamber (31) defined by the lower face end of the piston slide toward the guide bore.

12. A magnetic valve as defined by claim 3, in which an end of said guide bore (4') remote from the annular chamber (17) has an annular, flat recess (86), in which an O-ring (87) is movable axially back and forth with slight defqrmation, which ring on the other side rests with its inside diameter on a cylindrical portion (21″) of said piston slide protruding from the guide bore, which portion (21″) is reduced in diameter as compared with the guide portion (11) of the piston slide, and which portion (21″), between where said portion (21″) is contacted by said O-ring (87) and the guide portion (11), has a connecting conduit (27), which leads to the chamber (31) defined by the lower face end of the piston slide toward the guide bore.

13. A magnetic valve as defined by claim 4, in which an end of said guide bore (4′) remote from the annular chamber (17) has an annular, flat recess (86), in which an O-ring (87) is movable axially back and forth with slight deformation, which ring on the other side rests with its inside diameter on a cylindrical portion (21″) of said piston slide protruding from the guide bore, which portion (21″) is reduced in diameter as compared with the guide portion (11) of the piston slide, and which portion (21″), between where said portion (21″) is contacted by said O-ring (87) and the guide portion (11), has a connecting conduit (27), which leads to the chamber (31) defined by the lower face end of the piston slide toward the guide bore.

14. A magnetic valve as defined by claim 10, in which said piston slide has an axially continuous recess (30, 26″), wherein a protruding cylindrical portion (21″) is connected to the armature (22) of the electromagnet (13) and is closed on the face end, and the chamber (28″) receiving the armature (22) and the electromagnet is relieved to the ambient air via a throttle (93).

15. A magnetic valve as defined by claim 11, in which said piston slide has an axially continuous recess (30, 26″), wherein a protruding cylindrical portion (21″) is connected to the armature (22) of the electromagnet (13) and is closed on the face end, and the chamber (28″) receiving the armature (22) and the electromagnet is relieved to the ambient air via a throttle (93).

16. A magnetic valve as defined by claim 12, in which said piston slide has an axially continuous recess (30, 26″), wherein a protruding cylindrical portion (21″) is connected to the armature (22) of the electromagnet (13) and is closed on the face end, and the chamber (28″) receiving the armature (22) and the electromagnet is relieved to the ambient air via a throttle (93).

17. A magnetic valve as defined by claim 13, in which said piston slide has an axially continuous recess (30, 26″), wherein a protruding cylindrical portion (21″) is connected to the armature (22) of the electromagnet (13) and is closed on the face end, and the chamber (28″) receiving the armature (22) and the electromagnet is relieved to the ambient air via a throttle (93).

18. A magnetic valve as defined by claim 14, in which said piston slide has an axially continuous recess (30, 26″), wherein a protruding cylindrical portion (21″) is connected to the armature (22) of the electromagnet (13) and is closed on the face end, and the chamber (28″) receiving the armature (22 and the electromagnet is relieved to the ambient air via a throttle (93).

19. A magnetic valve as defined by claim 1, in which an end of the guide bore (4′) remote from the annular chamber (17) has an annular, flat recess (6), in which an O-ring (87) is movable axially back and forth with slight deformation, which ring on the other side rests with its inside diameter on a cylindrical portion (21″) of said piston slide protruding from the guide bore, which portion (11″) is reduced in diameter as compared with the guide portion (11) of the piston slide, and which portion (21″), between where said portion (21″) is contacted by the O-ring (87) and the guide portion (11), has a connecting conduit, which leads to a relief chamber, and that the end of the outlet bore (5″) remote from the annular chamber (17) has an annular, flat recess (96), in which a second O-ring (97) is movable axially back and forth with slight deformation, which ring on the other side rests with its inside diameter on the end of the second cylindrical portion (16), which is displaceable in the guide bore (5)), and the chamber (98) enclosed toward the annular chamber by the O-ring leads away via a connecting conduct to the relief chamber.

20. A magnetic valve as defined by claim 19, in which said piston slide has an axially continuous recess (30, 26″), wherein the armature (22)of the electromagnet is connected to the cylindrical portion (21″), and the chamber (28″) receiving the armature and the electromagnet is relieved to the ambient air via a throttle (93).

21. A magnetic valve as defined by claim 1, which in addition to said restoring spring (32), a second spring (100) is provided, which is fastened between a stationary portion (76) of the magnetic valve housing and a spring plate (101) supported on an adjustable stop (103) on said magnetic valve housing, which spring plate, beyond a partial stroke of the piston slide in the closing direction, comes to rest on a stop (104) on the piston slide and via the remaining closing stroke of the piston slide is lifted from the stationary portion.

* * * * *